(12) United States Patent
Hu

(10) Patent No.: US 8,093,773 B2
(45) Date of Patent: Jan. 10, 2012

(54) MOTOR FOR TREADMILL

(75) Inventor: Hui Hu, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 0 days.

(21) Appl. No.: 12/717,217

(22) Filed: Mar. 4, 2010

(65) Prior Publication Data

US 2010/0225186 A1  Sep. 9, 2010

(30) Foreign Application Priority Data

Mar. 4, 2009 (CN) ............... 2009 2 0052356 U

(51) Int. Cl.
H02K 7/02 (2006.01)
H02K 1/28 (2006.01)
(52) U.S. Cl. ............... 310/74; 310/216.123; 74/572.1; 74/572.2
(58) Field of Classification Search ............... 310/74, 310/216.123; 74/512.1, 11, 12, 2
See application file for complete search history.

(56) References Cited

U.S. PATENT DOCUMENTS

| | | | | |
|---|---|---|---|---|
| 3,947,710 A * | 3/1976 | Miyamoto | ............... | 310/153 |
| 4,520,688 A * | 6/1985 | Ban | ............... | 74/572.1 |
| 4,695,261 A * | 9/1987 | Broughton et al. | ............... | 440/61 R |
| 4,785,687 A * | 11/1988 | Luksch et al. | ............... | 74/543 |
| 4,819,502 A * | 4/1989 | Nakajima et al. | ............... | 74/572.1 |
| 5,723,923 A * | 3/1998 | Clagett | ............... | 310/74 |
| 6,249,069 B1 * | 6/2001 | Krueger | ............... | 310/74 |
| 6,547,527 B2 * | 4/2003 | Gaither | ............... | 417/16 |
| 6,695,581 B2 * | 2/2004 | Wasson et al. | ............... | 416/60 |
| 6,784,575 B2 * | 8/2004 | Okuda | ............... | 310/58 |
| 7,083,550 B2 * | 8/2006 | Ko | ............... | 482/54 |
| 7,217,226 B2 * | 5/2007 | Wasson et al. | ............... | 482/54 |
| 7,290,737 B2 * | 11/2007 | Roder et al. | ............... | 244/165 |
| 2005/0168085 A1 * | 8/2005 | Ihata et al. | ............... | 310/90 |

* cited by examiner

Primary Examiner — Quyen Leung
Assistant Examiner — Thomas Truong
(74) Attorney, Agent, or Firm — Matthias Scholl P.C.; Matthias Scholl

(57) ABSTRACT

A motor for a treadmill, containing at least a housing (1), a stator (2), a rotor (3) having a rotating shaft (4), a front end cover (9), a rear end cover (5), and a flywheel (13). The front end cover (9) and the rear end cover (5) are disposed on both ends of the housing (1), respectively. The stator (2) and the rotor (3) are disposed in the housing (1). A front end of the rotating shaft (4) extends from the housing (1). The flywheel (13) is disposed on the front end of the rotating shaft (4). The rotating shaft (4) is connected to the flywheel (13) via key (14). A sleeve (12) is fit on the front end of the rotating shaft (4). The sleeve (12) abuts against the flywheel (13). A locking device is disposed at the end of the rotating shaft (4) and tightly fixes the flywheel (13).

6 Claims, 2 Drawing Sheets

MOTOR FOR TREADMILL

CROSS-REFERENCE TO RELATED APPLICATIONS

Pursuant to 35 U.S.C. §119 and the Paris Convention Treaty, this application claims the benefit of Chinese Patent Application No. 200920052356.4 filed on Mar. 4, 2009, the contents of which are incorporated herein by reference.

BACKGROUND OF THE INVENTION

1. Field of the Invention

The invention relates to a motor, and more particularly to a motor for a treadmill.

2. Description of the Related Art

Treadmills are widely used nowadays. A conventional motor for a treadmill comprises a flywheel and a rotating shaft connected via a key. However, there are several non-neglectable problems with the motor: connection between the flywheel and the rotating shaft is complex and loose, and the flywheel and the rotating shaft are difficult to be installed, which unnecessarily increases cost. Moreover, since the connection between the flywheel and the rotating shaft is loose, the flywheel may move axially with respect to the rotating shaft, which causes the motor to be unstable and to generate noise during operation, thus greatly reducing the work life of the motor.

SUMMARY OF THE INVENTION

In view of the above-described problem, it is one objective of the invention to provide a motor for a treadmill that addresses the above-mentioned problems.

To achieve the above objectives, in accordance with one embodiment of the invention, provided is a motor for a treadmill, comprising a housing, a stator, a rotor having a rotating shaft, a front end cover, a rear end cover, and a flywheel, wherein the front end cover and the rear end cover are disposed on both ends of the housing, the stator and the rotor are disposed in the housing, a front end of the rotating shaft extends from the housing, the flywheel is disposed on the front end of the rotating shaft, the rotating shaft is connected to the flywheel via a key, a sleeve is fit on the front end of the rotating shaft, the sleeve abuts against the flywheel, and a locking device is disposed on an end of the rotating shaft and tightly fixes the flywheel.

In a class of this embodiment, the locking device comprises a stop plate and a screw.

In a class of this embodiment, a screw hole is disposed on a front end of the rotating shaft.

In a class of this embodiment, the screw passes through the stop plate, enters the screw hole, and forces the stop plate to axially move.

In a class of this embodiment, a flange is disposed on inner wall of the flywheel.

In a class of this embodiment, the stop plate presses the flange.

In a class of this embodiment, the stop plate and the sleeve operate to axially fix the flywheel In a class of this embodiment, an impeller is disposed on a rear end of the rotating shaft whereby facilitating axial blowing and heat dissipation.

In a class of this embodiment, the back of the sleeve abuts against an end of a bearing.

Advantages of the invention comprise: by way of fixing the flywheel via the sleeve and the locking device, the flywheel is not to move axially with respect to the rotating shaft, and thus the motor rotates stably, no noise is generated during operation, and work life of the motor is increased; moreover, connection between the flywheel and the rotating shaft is simple and tight, and the flywheel and the rotating shaft are easy to be installed, which reduce cost.

DETAILED DESCRIPTION OF THE EMBODIMENTS

Detailed description will be given below in conjunction with accompanying drawings.

Figure 1:
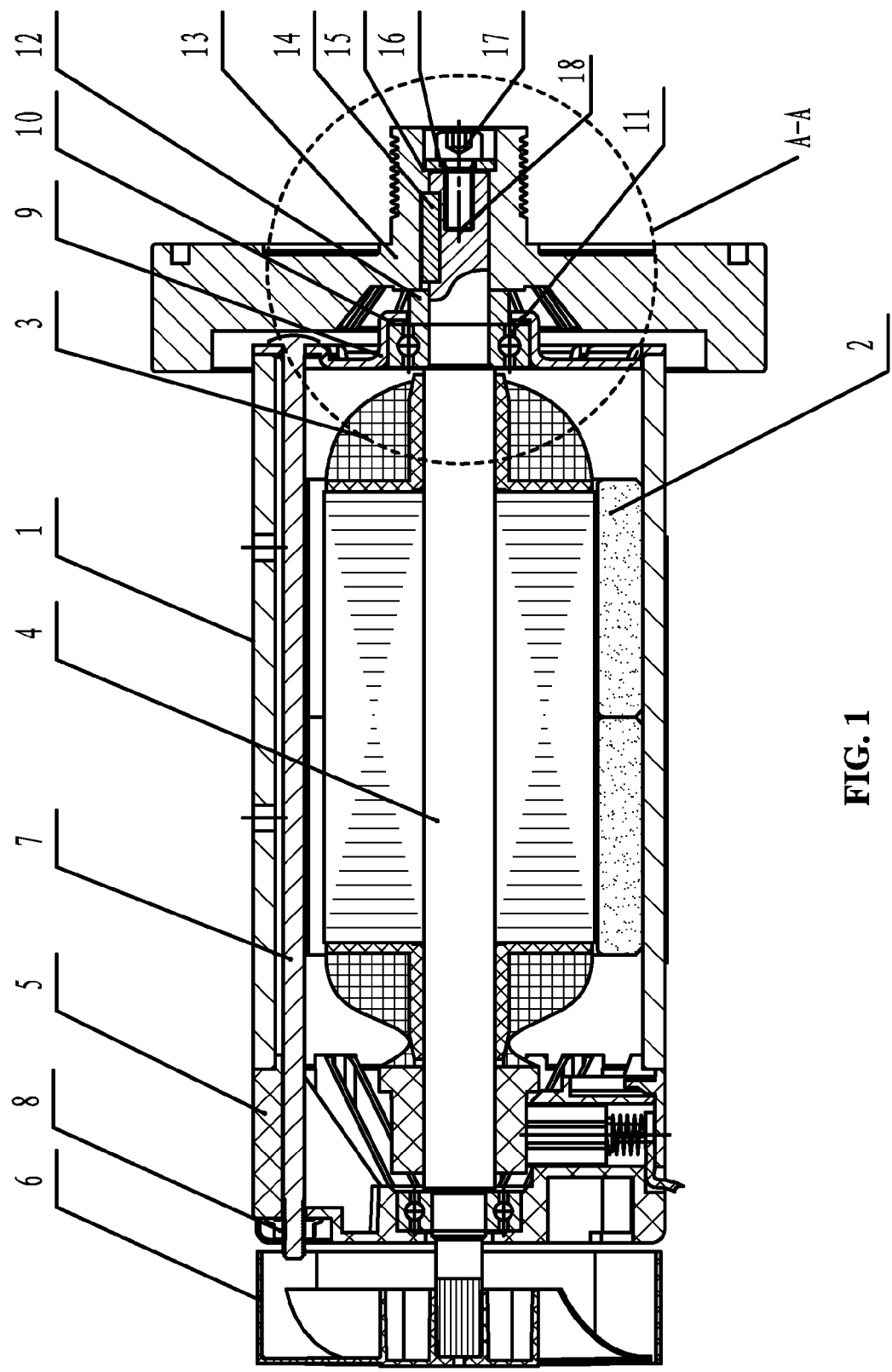
FIG. 1 is a schematic view of a motor for a treadmill of an exemplary embodiment of the invention.
Figure 2:
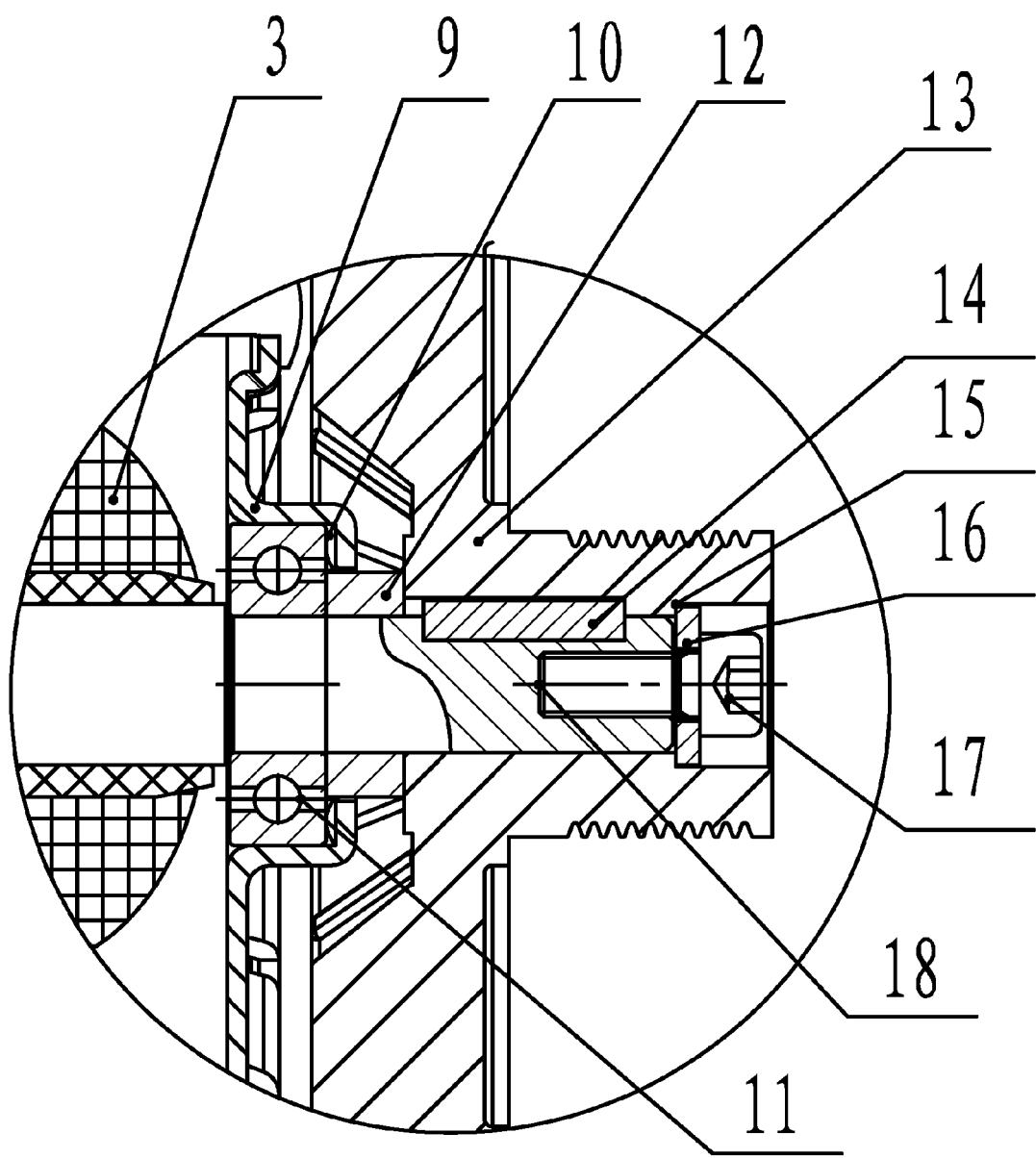
FIG. 2 is a partially enlarged view of FIG. 1 along a line A-A.

As shown in FIGS. 1 and 2, a motor for a treadmill of the invention comprises a housing 1, a stator 2, a rotor 3 having a rotating shaft 4, a front end cover 9, a rear end cover 5, and a flywheel 13.

The front end cover 9 and the rear end cover 5 are disposed on both ends of the housing 1.

The stator 2 and the rotor 3 are disposed in the housing 1.

A front end of the rotating shaft 4 extends from the housing 1.

The flywheel 13 is disposed on the front end of the rotating shaft 4.

The rotating shaft 4 is connected to the flywheel 13 via a key 14.

A sleeve 12 is fit on the front end of the rotating shaft 4, and abuts against the flywheel 13.

A locking device is disposed on an end of the rotating shaft 4 and tightly fixes the flywheel 13.

The locking device comprises a stop plate 16 and a screw 17.

A screw hole 18 is disposed on a front end of the rotating shaft 4.

The screw 17 passes through the stop plate 16, enters the screw hole 18, and forces the stop plate 16 to axially move.

A flange 15 is disposed on inner wall of the flywheel 13. In this embodiment, the flange 15 is annular.

The stop plate 16 presses the flange 15.

The stop plate 16 and the sleeve 12 operate to axially fix the flywheel 13.

An impeller 6 is disposed on a rear end of the rotating shaft 4 whereby facilitating axial blowing and heat dissipation.

The back of the sleeve 12 abuts against one end of a bearing 11.

Installation of the motor of the invention is as follows: firstly, the stator 2 and the rotor 3 are disposed in the housing 1, the front end cover 9 and the rear end cover 5 are disposed on both ends of the housing 1, a front end of the rotating shaft 4 extends from the housing 1, the impeller 6 is disposed on the rear end of the rotating shaft 4, the rear end cover 5, the front end cover 9 and the housing 1 are connected altogether via another screw 7 and a screw nut 8, and a wave-shaped washer 10 is disposed between the bearing 11 and the front end cover 9, then the back of the sleeve 12 abuts against one end of the bearing 11, the key 14 is disposed on the front end of the rotating shaft 4, the flywheel 13 is fit in the rotating shaft 4, and the sleeve 12 abuts against the back of the flywheel 13, finally, the stop plate 16 presses the flange 15, the screw 17 passes through the stop plate 16, enters the screw hole 18 and forces the stop plate 16 to axially move, and the stop plate 16 and the sleeve 12 axially fix the flywheel 13.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A motor for a treadmill, comprising
a housing (1);
a stator (2);
a rotor (3) having a rotating shaft (4);
a front end cover (9);
a rear end cover (5); and
a flywheel (13);
wherein
said front end cover (9) and said rear end cover (5) are disposed on both ends of said housing (1), respectively;
said stator (2) and said rotor (3) are disposed in said housing (1);
a front end of said rotating shaft (4) extends from said housing (1);
said flywheel (13) is disposed on said front end of said rotating shaft (4);
said rotating shaft (4) is connected to said flywheel (13) via a key (14);
a sleeve (12) is fit on said front end of said rotating shaft (4);
said sleeve (12) abuts against said flywheel (13);
a locking device is disposed on an end of said rotating shaft (4) and tightly fixes said flywheel (13);
said locking device comprises a stop plate (16) and a screw (17);
a screw hole (18) is disposed on a front end of said rotating shaft (4);
said screw (17) passes through said stop plate (16), enters said screw hole (18), and forces said stop plate (16) to axially move;
a flange (15) is disposed on inner wall of said flywheel (13);
said stop plate (16) presses said flange (15);
said stop plate (16) and said sleeve (12) operate to axially fix said flywheel (13);
an impeller (6) is disposed on a rear end of said rotating shaft (4) whereby facilitating axial blowing and heat dissipation; and
a wave-shaped washer (10) is disposed between said front end cover (9) and a bearing (11), wherein said bearing (11) is disposed in said front end cover (9).

2. The motor of claim 1, wherein the back of said sleeve (12) abuts against an end of said bearing (11).

3. A motor for a treadmill, comprising
a housing (1);
a stator (2);
a rotor (3) having a rotating shaft (4);
a front end cover (9);
a rear end cover (5); and
a flywheel (13); wherein
said front end cover (9) and said rear end cover (5) are disposed on both ends of said housing (1), respectively;
said stator (2) and said rotor (3) are disposed in said housing (1);
a front end of said rotating shaft (4) extends from said housing (1);
said flywheel (13) is disposed on said front end of said rotating shaft (4);
said rotating shaft (4) is connected to said flywheel (13) via a key (14);
a sleeve (12) is fit on said front end of said rotating shaft (4);
said sleeve (12) abuts against said flywheel (13);
a locking device is disposed on an end of said rotating shaft (4) and tightly fixes said flywheel (13);
said locking device comprises a stop plate (16) and a screw (17);
a screw hole (18) is disposed on a front end of said rotating shaft (4);
said screw (17) passes through said stop plate (16), enters said screw hole (18), and forces said stop plate (16) to axially move;
a flange (15) is disposed on inner wall of said flywheel (13);
said stop plate (16) presses said flange (15);
said stop plate (16) and said sleeve (12) operate to axially fix said flywheel (13); and
an impeller (6) is disposed on a rear end of said rotating shaft (4) whereby facilitating axial blowing and heat dissipation.

4. The motor of claim 3, wherein the back of said sleeve (12) abuts against an end of a bearing (11).

5. The motor of claim 1, wherein said stop plate (16) and said sleeve (12) axially position and fix said flywheel on said rotating shaft (4).

6. The motor of claim 3, wherein said stop plate (16) and said sleeve (12) axially position and fix said flywheel on said rotating shaft (4).

* * * * *